United States Patent
Zhou (10) Patent No.: US 7,778,327 B2
(45) Date of Patent: Aug. 17, 2010

(54) H.264 QUANTIZATION

(75) Inventor: Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1191 days.

(21) Appl. No.: 11/347,338

(22) Filed: Feb. 3, 2006

(65) Prior Publication Data

US 2006/0177142 A1 Aug. 10, 2006

Related U.S. Application Data

(60) Provisional application No. 60/651,358, filed on Feb. 8, 2005.

(51) Int. Cl.
*H04N 7/12* (2006.01)

(52) U.S. Cl. ............... 375/240.03; 382/248; 348/395.1; 348/403.1; 348/404.1; 348/405.1; 348/406.1; 348/407.1; 348/408.1

(58) Field of Classification Search ............ 375/240.03; 382/248; 348/395.1, 403.1, 404.1, 405.1, 348/406.1, 407.1, 408.1
See application file for complete search history.

(56) References Cited

U.S. PATENT DOCUMENTS

| | | | | |
|---|---|---|---|---|
| 5,241,383 A * | 8/1993 | Chen et al. | ............. | 375/240.04 |
| 5,481,309 A * | 1/1996 | Juri et al. | ............... | 375/240.03 |
| 5,506,844 A * | 4/1996 | Rao | ............. | 370/468 |
| 5,991,454 A * | 11/1999 | Fowler | ............. | 382/251 |
| 6,256,608 B1 * | 7/2001 | Malvar | ............. | 704/230 |
| 6,631,162 B1 * | 10/2003 | Lee et al. | ............. | 375/240.16 |
| 6,882,685 B2 * | 4/2005 | Malvar | ............. | 375/240.03 |
| 6,950,558 B2 * | 9/2005 | Schwartz et al. | ............. | 382/240 |
| 7,428,342 B2 * | 9/2008 | Tu et al. | ............. | 382/248 |
| 2003/0035587 A1 * | 2/2003 | Youn | ............. | 382/238 |
| 2003/0202579 A1 * | 10/2003 | Lin et al. | ............. | 375/240.03 |
| 2004/0151253 A1 * | 8/2004 | Bossen | ............. | 375/243 |

OTHER PUBLICATIONS

Wiegand, "Overview of the H.264/AVC video coding standard", IEEE Transactions on Circuits and Systems for Video Technology, Issue Date: Jul. 2003 vol. 13 Issue:7 on pp. 560-576.*
Malvar, "Low-complexity transform and quantization in H.264/AVC", IEEE Transactions on Circuits and Systems for Video Technology, Issue Date: Jul. 2003 vol. 13 Issue: 7 on pp. 598-603.*
Sullivan, The H.264/AVC Advanced Video Coding Standard: Overview and Introduction to the Fidelity Range Extensions, presented at the SPIE Conference on Applications of Digital Image Processing XXVII Special Session on Advances in the New Emerging Standard: H.264/AVC, Aug. 2004.*
Malvar, "Low-complexity transform and quantization with 16-bit arithmetic for H.26L", 2002 International Conference on Image Processing, 2002, Proceedings, vol. 2 Publication Year: 2002, pp. II-489-II-492 vol. 2.*
Richardson, "H.264 and MPEG-4 Video Compression: Video Coding for Next-generation Multimedia" 2003 John Wiley & Sons, Ltd. ISBN: 0-470-84837-5 pp. 187-194.*

* cited by examiner

*Primary Examiner*—Juan A Torres
(74) *Attorney, Agent, or Firm*—Mirna Abyad; Wade J. Brady, III; Frederick J. Telecky, Jr.

(57) ABSTRACT

Low complexity (16 bit arithmetic) H.264 video compression replaces a single quantization table for all quantization parameters with multiple quantization tables and thereby equalizes quantization shifts and round-off additions; this eliminates the need for 32-bit accesses.

5 Claims, 4 Drawing Sheets

H.264 QUANTIZATION

CROSS-REFERENCE TO RELATED APPLICATIONS

This application claims priority from provisional application No. 60/651,358, filed Feb. 8, 2005. The following co-assigned copending patent applications disclose related subject matter: Appl. No.: PCT/US04/031,480, filed Sep. 24, 2004 and Ser. No. 10/990,917, filed Nov. 16, 2004.

BACKGROUND OF THE INVENTION

The present invention relates to digital image and video signal processing, and more particularly to block transformation and/or quantization plus inverse quantization and/or inverse transformation.

Various applications for digital video communication and storage exist, and corresponding international standards have been and are continuing to be developed. Low bit rate communications, such as video telephony and conferencing, plus large video file compression, such as motion pictures, led to various video compression standards: H.261, H.263, MPEG-1, MPEG-2, AVS, and so forth. These compression methods rely upon the discrete cosine transform (DCT) or an analogous transform plus quantization of transform coefficients to reduce the number of bits required to encode.

Figure 2A:
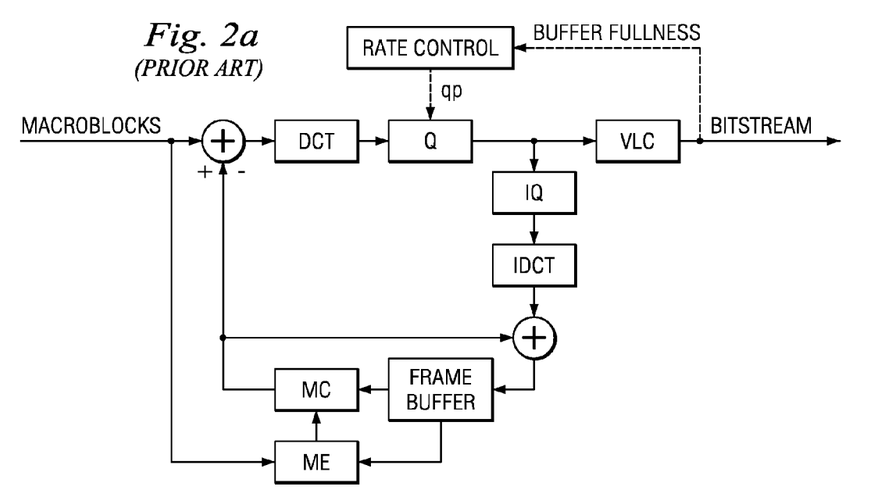
FIGS. 2a-2b illustrate motion compensation video compression with DCT and other transformation and quantization.

DCT-based compression methods decompose a picture into macroblocks where each macroblock contains four 8×8 luminance blocks plus two 8×8 chrominance blocks, although other block sizes and transform variants could be used. FIG. 2a depicts the functional blocks of DCT-based video encoding. In order to reduce the bit-rate, 8×8 DCT is used to convert the 8×8 blocks (luminance and chrominance) into the frequency domain. Then, the 8×8 blocks of DCT-coefficients are quantized, scanned into a 1-D sequence, and coded by using variable length coding (VLC). For predictive coding in which motion compensation (MC) is involved, inverse-quantization and IDCT are needed for the feedback loop. Except for MC, all the function blocks in FIG. 2a operate on an 8×8 block basis. The rate-control unit in FIG. 2a is responsible for generating the quantization step (qp) in an allowed range and according to the target bit-rate and buffer-fullness to control the DCT-coefficients quantization unit. Indeed, a larger quantization step implies more vanishing and/or smaller quantized coefficients which means fewer and/or shorter codewords and consequent smaller bit rates and files.

There are two kinds of coded macroblocks. An INTRA-coded macroblock is coded independently of previous reference frames. In an INTER-coded macroblock, the motion compensated prediction block from the previous reference frame is first generated for each block (of the current macroblock), then the prediction error block (i.e. the difference block between current block and the prediction block) are encoded.

For INTRA-coded macroblocks, the first (0,0) coefficient in an INTRA-coded 8×8 DCT block is called the DC coefficient, the rest of 63 DCT-coefficients in the block are AC coefficients; while for INTER-coded macroblocks, all 64 DCT-coefficients of an INTER-coded 8×8 DCT block are treated as AC coefficients. The DC coefficients may be quantized with a fixed value of the quantization step, whereas the AC coefficients have quantization steps adjusted according to the bit rate control which compares bit used so far in the encoding of a picture to the allocated number of bits to be used. Further, a quantization matrix (e.g., as in MPEG-4) allows for varying quantization steps among the DCT coefficients.

In particular, the 8×8 two-dimensional DCT is defined as:

$$F(u, v) = \frac{1}{4} C(u) C(v) \sum_{x=0}^{7} \sum_{y=0}^{7} f(x, y) \cos\frac{(2x+1)u\pi}{16} \cos\frac{(2y+1)v\pi}{16}$$

where f(x,y) is the input 8×8 sample block and F(u,v) the output 8×8 transformed block where u,v,x,y=0, 1, ..., 7; and $$C(u), C(v) = \begin{cases} \frac{1}{\sqrt{2}} & \text{for } u, v = 0 \\ 1 & \text{otherwise} \end{cases}$$

Note that this transforming has the form of 8×8 matrix multiplications, $F=D^t \times f \times D$, where "x" denotes 8×8 matrix multiplication and D is the 8×8 matrix with u,x element equal to $$C(u) \cos\frac{(2x+1)u\pi}{16}.$$

The transform is performed in double precision, and the final transform coefficients are rounded to integer values.

Next, define the quantization of the transform coefficients as $$QF(u, v) = \frac{F(u, v)}{QP}$$

where QP is the quantization factor computed in double precision from the quantization step, qp, as an exponential such as: $QP=2^{qp/6}$. The quantized coefficients are rounded to integer values and are encoded.

The corresponding inverse quantization becomes:

$$F'(u,v)=QF(u,v)*QP$$

with double precision values rounded to integer values.

Lastly, the inverse transformation (reconstructed sample block) is:

$$f'(x, y) = \frac{1}{4} \sum_{u=0}^{7} \sum_{v} C(u) C(v) F'(u, v) \cos\frac{(2x+1)u\pi}{16} \cos\frac{(2y+1)v\pi}{16}$$

again with double precision values rounded to integer values.

Various more recent video compression methods, such as the H.264 and AVS standards, simplify the double precision DCT method by using integer transforms in place of the DCT and/or different size blocks. Indeed, define an n×n integer transform matrix, $T_{n \times n}$, with elements analogous to the 8×8 DCT transform coefficients matrix D. Then, with $f_{n \times n}$ and $F_{n \times n}$ denoting the input n×n sample data matrix (block of pixels or residuals) and the output n×n transform-coefficients block, respectively, define the forward n×n integer transform as:

$$F_{n \times n} = T^t_{n \times n} \times f_{n \times n} \times T_{n \times n}$$

where "x" denotes n×n matrix multiplication, and the n×n matrix $T^t_{n \times n}$ is the transpose of the n×n matrix $T_{n \times n}$.

Figure 3:
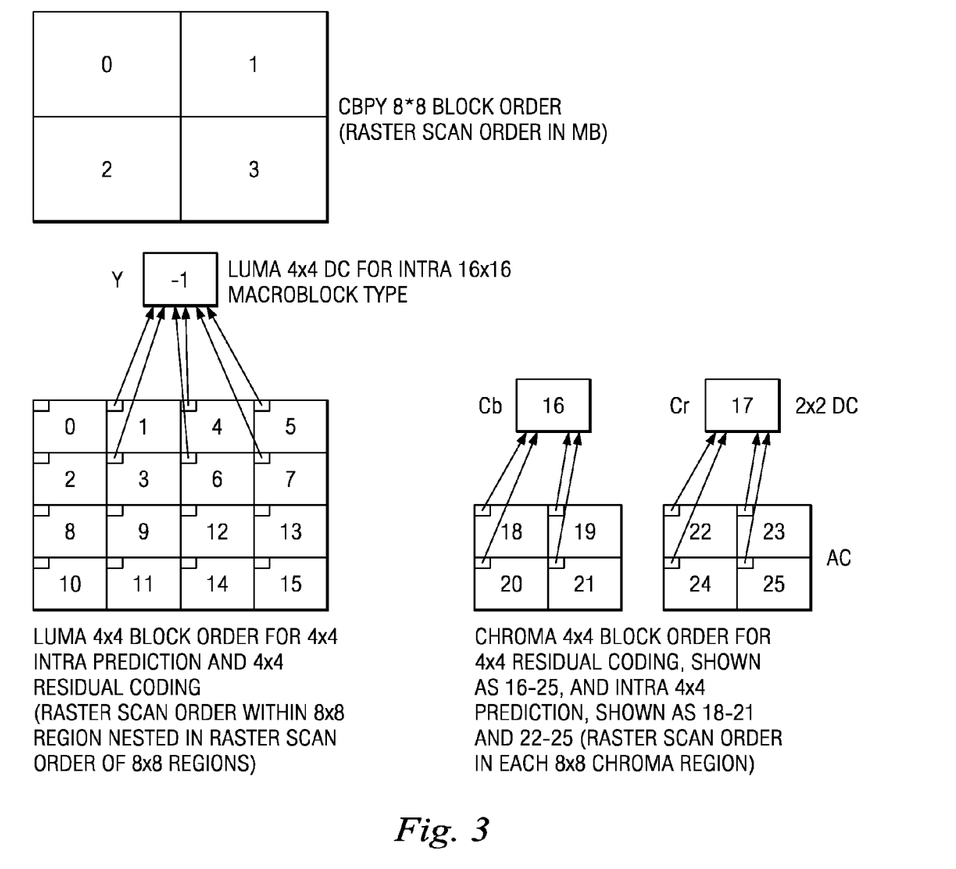
FIG. 3 shows H.264 macroblock structure.

For example, as in other existing video standards, in H.264 the smallest coding unit is a macroblock which contains four 8×8 luminance blocks plus two 8×8 chrominance blocks from the two chrominance components. However, as shown in FIG. 3, in H.264 the 8×8 blocks are further divided into 4×4 blocks for transform plus quantization, which leads to a total of twenty-four 4×4 blocks for a macroblock. After the integer transform, the four DC values from each of two chrominance components are pulled together to form two chrominance DC blocks, on which an additional 2×2 transform plus quantization is performed. Similarly, if a macroblock is coded in INTRA 16×16 mode, the sixteen DC values of the sixteen 4×4 luminance blocks are put together to create a 4×4 luminance DC block, on which 4×4 luminance DC transform plus quantization is carried out.

Therefore, in H.264 there are three kinds of transform plus quantization, namely, 4×4 transform plus quantization for twenty-four luminance/chrominance blocks; 2×2 transform plus quantization for two chrominance DC blocks; and 4×4 transform plus quantization for the luminance DC blocks if the macroblock is coded as INTRA 16×16 mode.

The quantization of the transformed coefficients may be exponentials of the quantization step as above or may use lookup tables with integer entries. The inverse quantization mirrors the quantization. And the inverse transform also uses $T_{n \times n}$, and its transpose analogous to the DCT using D and its transpose for both the forward and inverse transforms.

However, these alternative methods still have computational complexity which could be reduced while maintaining performance.

SUMMARY OF THE INVENTION

The present invention provides low-complexity quantization for H.264 image/video processing by modification of quantization tables per quantization parameter.

The preferred embodiment methods provide for simplified 16-bit operations useful in H.264 video coding.

DESCRIPTION OF THE PREFERRED EMBODIMENTS

1. Overview

The preferred embodiment methods provide simplified 4×4 and 2×2 transformed block quantizations which apply to the 16-bit H.264 method. The quantization lookup tables are made dependent upon the quantization parameter to equalize the round-off and shifting; this avoids 32-bit accesses.

Figure 1A:
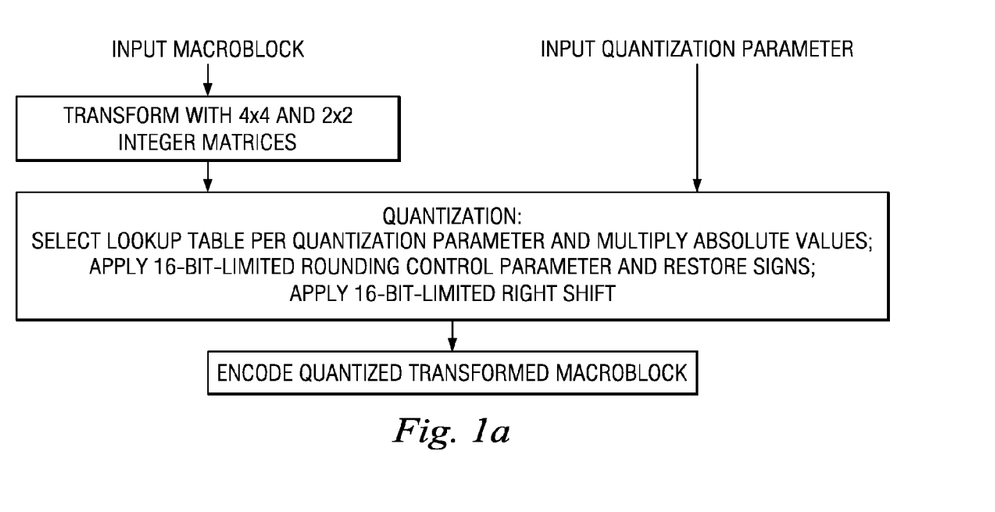
FIGS. 1a-1b are flow diagrams.
Figure 1B:
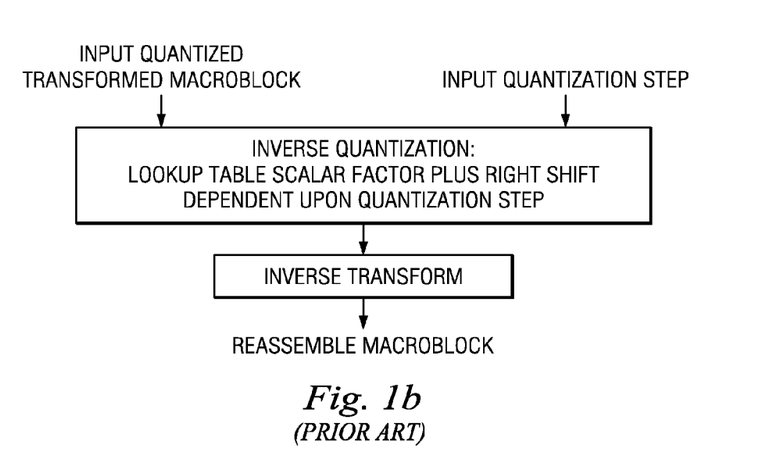
Figure 2B:
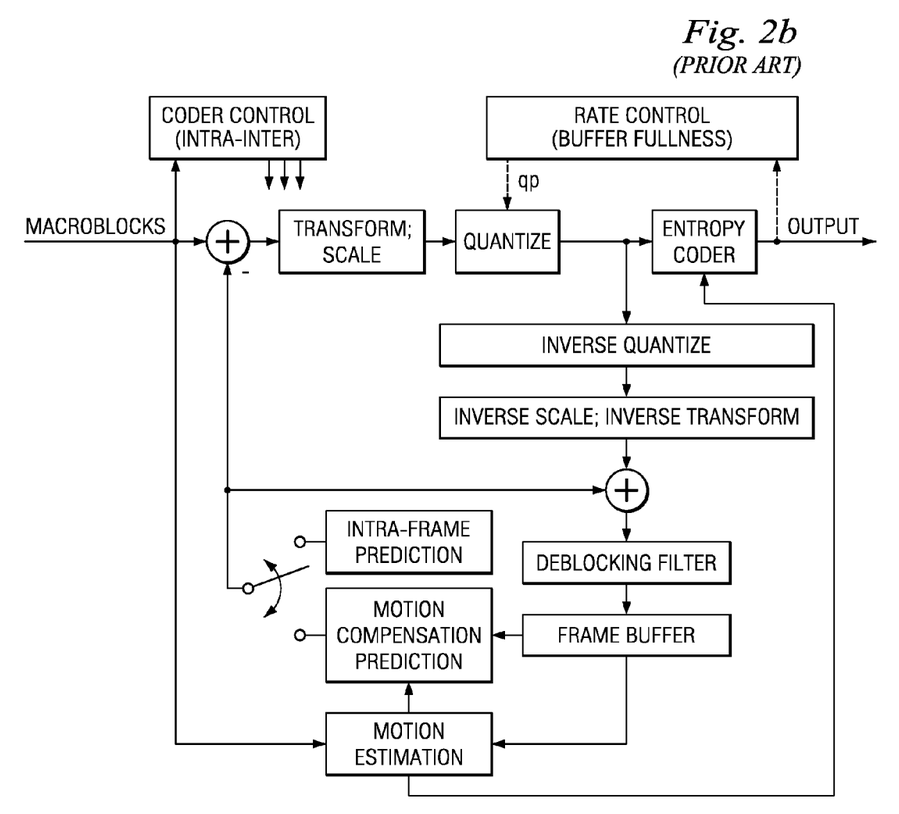

The methods have application to video compression which operates on blocks of (motion-compensated) pixels with H.264 integer transformation plus quantization of the transformed coefficients where the quantization can vary widely. For H.264 encoding as illustrated in FIG. 2b, buffer fullness feedback from the bitstream output buffer may determine the quantization factor, which typically varies in the range from 1 to 200-500. The preferred embodiment methods would apply in block "quantize" in FIG. 2b. FIGS. 1a-1b are transform/quantization of encode and decode flows.

Preferred embodiment systems perform preferred embodiment methods with digital signal processors (DSPs) or general purpose programmable processors or application specific circuitry or systems on a chip (SoC) such as both a DSP and Reduced Instruction Set Computer (RISC) processor on the same chip with the RISC processor controlling. In particular, digital still cameras (DSCs) with video clip capabilities or cell phones with video capabilities could include the preferred embodiment methods. A stored program could be in an onboard ROM or external flash EEPROM for a DSP or programmable processor to perform the signal processing of the preferred embodiment methods. Analog-to-digital converters and digital-to-analog converters provide coupling to the real world, and modulators and demodulators (plus antennas for air interfaces) provide coupling for transmission waveforms.

2. H.264 Background

Initially, consider the H.264 transform, quantization, and their inverses for each of the three block types: 4×4 luminance/chrominance blocks, 2×2 chrominance DC blocks, and 4×4 luminance DC blocks; the preferred embodiment methods provide simplifications of the quantizations of H.264.

(a) Forward Transform for 4×4 Luminance/Chrominance Blocks

The forward 4×4 transform uses the following 4×4 transform matrix, $T_{4 \times 4}$, for matrix multiplications with each 4×4 sample data matrix of the twenty-four 4×4 luminance/chrominance blocks of a macroblock:

$$T_{4 \times 4} = \begin{bmatrix} 1 & 2 & 1 & 1 \\ 1 & 1 & -1 & -2 \\ 1 & -1 & -1 & 2 \\ 1 & -2 & 1 & -1 \end{bmatrix}$$

Thus the forward transform of 4×4 matrix with elements $x_{ij}$ to 4×4 matrix with elements $y_{ij}$ is $$\begin{bmatrix} y_{00} & y_{01} & y_{02} & y_{03} \\ y_{10} & y_{11} & y_{12} & y_{13} \\ y_{20} & y_{21} & y_{22} & y_{23} \\ y_{30} & y_{31} & y_{32} & y_{33} \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix}$$

$$\begin{bmatrix} 1 & 2 & 1 & 1 \\ 1 & 1 & -1 & -2 \\ 1 & -1 & -1 & 2 \\ 1 & -2 & 1 & -1 \end{bmatrix}$$

Note that the columns of $T_{4 \times 4}$ are orthogonal and that very roughly $T_{4 \times 4}$ is proportional to the 4×4 DCT matrix.

(b) Quantization for 4×4 Luminance/Chrominance Blocks

The $y_{ij}$ for i=0, 1, 2, 3 and j=0, 1, 2, 3 are quantized to give the $c_{ij}$ as a function of the quantization parameter qP by:

$c_{ij}$=sign($y_{ij}$)*(|$y_{ij}$|*QLevelScale(qP%6,i,j)+delta)>> (15+qP16)

where QLevelScale(qP %6, i,j) is the quantization lookup table; qP denotes either the luminance quantization parameter, $QP_Y$, or the chrominance quantization parameter, $QP_C$ (both $QP_Y$ and $QP_C$ are in the range 0, 1, . . . , 53); delta=$\alpha * 2^{15+qP/6}$ with 0<α<1 the round-off parameter; sign(.) is the signum function (sign(z)=+1 if z is positive, sign(z)=−1 if z is negative, and sign(0)=0); * denotes scalar multiplication; 1 is integer division (integer quotient and remainder discarded); % is the modulo operation which essentially is the remainder discarded from integer division; and >> and << denote right and left shifting, which applies to numbers when expressed in binary notation. Note that qP/6 lies in the range 0 to 8. The quantization lookup table consists of six 4×4 scaling matrices, one for each of the six possible values of qP %6. Each 4×4 scaling matrix has the same simple form but differing element values:

QLevelScale[6][4][4] =

{{{13107,8066,13107,8066},{8066,5423,8066,5423},

{13107,8066,13107,8066},{8066,5423,8066,5423}}

{{11916,7490,11916,7490},{7490,4660,7490,4660},

{11916,7490,11916,7490},{7490,4660,7490,4660}},

{{10082,6554,10082,6554},{6554,4194,6554,4194},

{10082,6554,10082,6554},{6554,4194,6554,4194}},

{{9362,5825,9362,5825},{5825,3647,5825,3647},

{9362,5825,9362,5825},{5825,3647,5825,3647}},

{{8192,5243,8192,5243},{5243,3355,5243,3355},

{8192,5243,8192,5243},{5243,3355,5243,3355}},

{{7282,4559,7282,4559},{4559,2893,4559,2893},

{7282,4559,7282,4559},{4559,2893,4559,2893}}};

Note that overall the quantization is roughly multiplication by an integer scaling factor which lies between $2^{11}$ and $2^{14}$ followed by integer division by $2^{15}$ which compensates for the size of the integer scaling factor, and then integer division by $2^{qP/6}$ which lies in the range 1 to $2^8$ and provides the reduction in the number of bits for quantization. The quantized coefficients $c_{ij}$ are ultimately encoded and transmitted/stored.

(c) Inverse Quantization for 4×4 Luminance/Chrominance Blocks

After decoding to recover the cy, inverse quantization for a 4×4 quantized block $c_{ij}$ with i=0, 1, 2, 3 and j=0, 1, 2, 3 gives $d_{ij}$ as:

$$d_{ij}=(c_{ij}*IQ\text{LevelScale}(qP\%6,i,j))<<qP/6$$

where, again, qP denotes either the luminance quantization parameter, $QP_Y$, or the chrominance quantization parameter, $QP_C$, and IQLevelScale(qP %6, i,j) is the inverse quantization lookup table entry. The inverse quantization lookup table again consists of a 4×4 scaling matrix for each of the six possible qP %6 with each 4×4 scaling matrix having four elements with a low value, eight with a middle value, and four with a high value:

IQLevelScale[6][4][4] =

{{{10,13,10,13},{13,16,13,16},{10,13,10,13},{13,16,13,16}},

{11,14,11,14},{14,18,14,18},{11,14,11,14},{14,18,14,18}},

{{13,16,13,16},{16,20,16,20},{13,16,13,16},{16,20,16,20}},

{{14,18,14,18},{18,23,18,23},{14,18,14,18},{18,23,18,23}},

{{16,20,16,20},{20,25,20,25},{16,20,16,20},{20,25,20,25}},

{{18,23,18,23},{23,29,23,29},{18,23,18,23},{23,29,23,29}}};

Note that the left shifting provides recovery of the number of bits lost in integer division by $2^{qP/6}$ during quantization, and that the increase in magnitude from multiplication by IQLevelScale(qP %6, i, j) is essentially offset by the prior decrease in magnitude by multiplication by QLevelScale(qP %6, i,j) plus division by $2^{15}$ in the quantization.

(d) Inverse Transform for 4×4 Luminance/Chrominance Blocks

The inverse 4×4 transform differs from the DCT in that the 4×4 transform matrix transpose is not equal to the 4×4 matrix inverse because the rows have differing norms; that is, $T_{4\times4}$ is not an orthogonal matrix. Indeed, the scaling matrices of the quantization and inverse quantization adjust the relative size of transformed pixels. Explicitly, the inverse transform uses the 4×4 matrix $V_{4\times4}$ and its transpose where:

$$V_{4\times4} = \begin{bmatrix} 1 & 1 & 1 & 1 \\ 1 & \frac{1}{2} & -\frac{1}{2} & -1 \\ 1 & -1 & -1 & 1 \\ \frac{1}{2} & -1 & 1 & -\frac{1}{2} \end{bmatrix}$$

Note that $V_{4\times4}$ looks like $T'_{4\times4}$ but with two columns scaled by ½ to reduce dynamic range. Thus the inverse transform of the 4×4 matrix with elements $d_{ij}$ for i=0, 1, 2, 3 and j=0, 1, 2, 3 is the 4×4 matrix with elements $h_{ij}$ defined as:

$$\begin{bmatrix} h_{00} & h_{01} & h_{02} & h_{03} \\ h_{10} & h_{11} & h_{12} & h_{13} \\ h_{20} & h_{21} & h_{22} & h_{23} \\ h_{30} & h_{31} & h_{32} & h_{33} \end{bmatrix} = \begin{bmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{bmatrix} \begin{bmatrix} d_{00} & d_{01} & d_{02} & d_{03} \\ d_{10} & d_{11} & d_{12} & d_{13} \\ d_{20} & d_{21} & d_{22} & d_{23} \\ d_{30} & d_{31} & d_{32} & d_{33} \end{bmatrix}$$

$$\begin{bmatrix} 1 & 1 & 1 & 1 \\ 1 & \frac{1}{2} & -\frac{1}{2} & -1 \\ 1 & -1 & -1 & 1 \\ \frac{1}{2} & -1 & 1 & -\frac{1}{2} \end{bmatrix}$$

Lastly, the $h_{ij}$ are scaled down to $r_{ij}=(h_{ij}+32)>>6$ to define the recovered (decoded and decompressed) data.

Similar transforms and quantization applies to the 2×2 chrominance DC blocks.

(e) Forward Transform for 2×2 Chrominance Dc Blocks

The forward 2×2 transform uses the following 2×2 transform matrix, $T_{2\times2}$, for matrix multiplications with each 2×2 sample data matrix of the two 2×2 chrominance DC blocks of a macroblock:

$$T_{2\times2} = \begin{bmatrix} 1 & 1 \\ 1 & -1 \end{bmatrix}$$

Thus the forward transform of 2×2 matrix with elements $x_{ij}$ to 2×2 matrix with elements $y_{ij}$ is:

$$\begin{bmatrix} y_{00} & y_{01} \\ y_{10} & y_{11} \end{bmatrix} = \begin{bmatrix} 1 & 1 \\ 1 & -1 \end{bmatrix} \begin{bmatrix} x_{00} & x_{01} \\ x_{10} & x_{11} \end{bmatrix} \begin{bmatrix} 1 & 1 \\ 1 & -1 \end{bmatrix}$$

(f) Quantization for 2×2 Chrominance DC Blocks

The $y_{ij}$ for i=0, 1 and j=0, 1 are quantized to give the $c_{ij}$ as a function of the quantization parameter $QP_C$ by:

$$c_{ij}=\text{sign}(y_{ij})*(|y_{ij}|*Q\text{LevelScale}(QP_C\%6,0,0)+\text{delta})\!>\!>(16+QPc/6)$$

where QLevelScale($QP_C$ %6, 0, 0) is an entry in the quantization lookup table listed in (b) above; $QP_C$ is the chrominance quantization factor as before and in the range 0, 1, . . . , 51; and delta=$\alpha*2^{16+QPc/6}$ with 0<$\alpha$<1 the round-off parameter. These quantized coefficients $c_{ij}$ are ultimately encoded and transmitted/stored.

(g) Inverse Transform for 2×2 Chrominance Dc Blocks

After decoding to recover a 2×2 quantized DC block $c_{ij}$ with i=0, 1 and j=0, 1, inverse 2×2 transform prior to inverse quantization to give $f_{ij}$ as:

$$\begin{bmatrix} f_{00} & f_{01} \\ f_{10} & f_{11} \end{bmatrix} = \begin{bmatrix} 1 & 1 \\ 1 & -1 \end{bmatrix}\begin{bmatrix} c_{00} & c_{01} \\ c_{10} & c_{11} \end{bmatrix}\begin{bmatrix} 1 & 1 \\ 1 & -1 \end{bmatrix}$$

Note that like the DCT, the transform is essentially its own inverse.

(h) Inverse Quantization for 2×2 Chrominance DC Blocks

The $f_{ij}$ for i=0, 1 and j=0, 1 are inverse quantized to give the $dcC_{ij}$ as a function of the quantization parameter $QP_C$ by:

$$dcC_{ij}=((f_{ij}*IQ\text{LevelScale}(QP_C\%6,0,0))\!<\!<QP_C/6)\!>\!>1$$

where, again, $QP_C$ denotes the chrominance quantization parameter, and IQLevelScale(qP %6, 0, 0) is a (0,0) entry of the inverse quantization lookup table listed in (c).

Lastly, similar transforms and quantization applies to the 4×4 luminance DC blocks.

(i) Forward Transform for 4×4 Luminance DC Blocks

The forward transform of 4×4 luminance DC block $x_{ij}$ to 4×4 matrix with elements $h_{ij}$ is $$\begin{bmatrix} h_{00} & h_{01} & h_{02} & h_{03} \\ h_{10} & h_{11} & h_{12} & h_{13} \\ h_{20} & h_{21} & h_{22} & h_{23} \\ h_{30} & h_{31} & h_{32} & h_{33} \end{bmatrix} = \begin{bmatrix} 1 & 1 & 1 & 1 \\ 1 & 1 & -1 & -1 \\ 1 & -1 & -1 & 1 \\ 1 & -1 & 1 & -1 \end{bmatrix}\begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix}$$

$$\begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

Then scale the $h_{ij}$ to get the transform $y_{ij}$ by $y_{ij}=(h_{ij}+1)\!>\!>1$.

(j) Quantization for 4×4 Luminance DC Blocks

The $y_{ij}$ for i=0, 1, 2, 3 and j=0, 1, 2, 3 are quantized to give the $c_{ij}$ as a function of the luminance quantization parameter $QP_Y$ by:

$$c_{ij}=\text{sign}(y_{ij})*(|y_{ij}|*Q\text{LevelScale}(QP_Y\%6,0,0)+\text{delta})\!>\!>(16+QP_Y/6)$$

where QLevelScale($QP_Y$ %6, 0, 0) is a (0,0) entry of the quantization lookup table listed in (b); and again delta=$\alpha*2^{16+QPy/6}$ with 0<$\alpha$<1 is the round-off parameter.

(k) Inverse Transform for 4×4 Luminance DC Blocks

After decoding to recover a 4×4 quantized DC block $c_{ij}$ with i=0, 1, 2, 3 and j=0, 1, 2, 3, inverse 4×4 transform prior to inverse quantization to give $f_{ij}$ as:

$$\begin{bmatrix} f_{00} & f_{01} & f_{02} & f_{03} \\ f_{10} & f_{11} & f_{12} & f_{13} \\ f_{20} & f_{21} & f_{22} & f_{23} \\ f_{30} & f_{31} & f_{32} & f_{33} \end{bmatrix} = \begin{bmatrix} 1 & 1 & 1 & 1 \\ 1 & 1 & -1 & -1 \\ 1 & -1 & -1 & 1 \\ 1 & -1 & 1 & -1 \end{bmatrix}\begin{bmatrix} c_{00} & c_{01} & c_{02} & c_{03} \\ c_{10} & c_{11} & c_{12} & c_{13} \\ c_{20} & c_{21} & c_{22} & c_{23} \\ c_{30} & c_{31} & c_{32} & c_{33} \end{bmatrix}$$

$$\begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

(l) Inverse Quantization for 4×4 Luminance DC Blocks

The $f_{ij}$ for i=0, 1, 2, 3 and j=0, 1, 2, 3 are inverse quantized to give the $dcY_{ij}$ as a function of the quantization parameter $QP_Y$ by:

$$dcY_{ij}=((f_{ij}*IQ\text{LevelScale}(QP_Y\%6,0,0))\!<\!<(QP_Y/6)+2)\!>\!>2$$

where, again, $QP_Y$ denotes the luminance quantization parameter, and IQLevelScale($QP_Y$ %6, 0, 0) is a (0,0) entry of the inverse quantization lookup table listed in (c).

3. First Preferred Embodiment

During the development of the H.264 standard, efforts were made to ensure that the H.264 transform and quantization could be implemented in 16-bit arithmetic. This goal has largely been achieved. However, the rounding control parameter delta used in the forward quantizations of foregoing steps (b), (f), and (j) may exceed 16 bits; and this makes the H.264 forward quantization implemented impractical on a processor which does not have 32-bit memory access. Indeed, delta=$\alpha*2^{15+qP/6}$ or $\alpha*2^{16+qP/6}$ which can be up to 24 bits. Consequently, the preferred embodiments provide forward quantizations for H.264 which have a constant delta. In particular, the preferred embodiment methods of transform plus quantization and their inverses for 4×4 luminance/chrominance blocks use foregoing steps (a), (c), and (d) but replace step (b) with new step (b'); for 2×2 chrominance DC blocks use foregoing steps (e), (g), and (h) but replace step (f) with new step (f'); and for 4×4 luminance DC blocks use foregoing steps (i), (k), and (l) but replace step (j) with new step (j'). These new steps are as follows:

(b') Preferred Embodiment Quantization for 4×4 Luminance/Chrominance Blocks The $y_{ij}$ for i=0, 1, 2, 3 and j=0, 1, 2, 3 are quantized to give the $c_{ij}$ as a function of the quantization parameter qP by:

$$c_{ij}=\text{sign}(y_{ij})*(|y_{ij}|*Q\text{Mat}^{(0)}(qP\%6,i,j)+\alpha*2^{15})\!>\!>15$$
when $qP16=0$ $$c_{ij}=\text{sign}(y_{ij})*(|y_{ij}|*Q\text{Mat}^{(qP/6-1)}(qP\%6,i,j)+\alpha*2^{16})\!>\!>16 \text{ otherwise}$$

where, as in (b), qP denotes either the luminance quantization parameter, $QP_Y$, or the chrominance quantization parameter, $QP_C$; and also as in (b), 0<$\alpha$<1 is the round-off parameter. QMat$^{(n)}$(qP %6, i,j) is a new quantization lookup table defined in terms of QLevelScale(qP %6, i,j), listed in (b), and defined as:

$$Q\text{Mat}^{(0)}(qP\%6,i,j)=Q\text{LevelScale}(qP\%6,i,j)$$

$$Q\text{Mat}^{(n)}(qP\%6,i,j)=(Q\text{LevelScale}(qP\%6,i,j)+2^{n-1})\!>\!>n \text{ for } n>0$$

That is, QLevelScale[6][4][4] is replaced by QMat$^{(0)}$[6][4][4], QMat$^{(1)}$[6][4][4], ..., or QMat$^{(7)}$[6][4][4], depending upon qP/6. Note that for QMat(n)[6][4][4] entries there is a right shift of n bits with round-off of the corresponding QLevelScale[6][4][4] entries; the right shift decreases the sizes of the entries from the range $2^{11}$-$2^{14}$ to the range $2^{11-n}$-$2^{14-n}$. (Note qP/6 in the range 0 to 8 implies that n will be in the range 1 to 7.) This use of more tables allows the qP/6-dependent size delta to be replaced by a constant size $\alpha*2^{16}$ (or $\alpha*2^{15}$ when qP/6=0) which is a 16-bit integer. For example, the three distinct values of the table QLevelScale(0, i,j) are 13107, 8066, and 5243; whereas, the corresponding entries of QMat$^{(7)}$(0, i, j) are 102, 63, and 41, respectively. This saves 7 bits by a trade-off with lower resolution.

(f') Preferred Embodiment Quantization for 2×2 Chrominance DC Blocks

The $y_{ij}$ for i=0, 1 and j=0, 1 are quantized to give the $c_{ij}$ as a function of the chrominance quantization parameter $QP_C$ by:

$$c_{ij}=\text{sign}(y_{ij})*|y_{ij}|*QMat^{(QPc/6)}(QP_C\%6,0,0)+\alpha**2^{16})>>16$$

where (b') defines QMat$^{(QPc/6)}$($QP_C$%6, 0, 0) and $\alpha$. Note that QMat$^{(8)}$($QP_C$%6, 0, 0) is also needed; whereas, (b') only uses QMat$^{(n)}$(qP %6, i, j) for n≦7.

(j') Preferred Embodiment Quantization for 4×4 Luminance DC Blocks

The $y_{ij}$ for i=0, 1, 2, 3 and j=0, 1, 2, 3 are quantized to give the cy as a function of the luminance quantization parameter $QP_Y$ by:

$$c_{ij}=\text{sign}(|y_{ij}|*QMat^{(QPy/6)}(QP_Y\%6,0,0)+\alpha*2^{16})>>16$$

where (b') defines QMat$^{(QPy/6)}$($QP_Y$%6, 0, 0) and $\alpha$. Again, note that QMat$^{(8)}$($QP_Y$%6, 0, 0) is also needed.

For an implementation in which table size is not a concern, the new quantization matrices used in (b'), (f'), and (j') can be pre-calculated and stored. The explicit new quantization matrices are as follows:

QMat$^{(0)}$[6][4][4] =
{{{13107, 8066, 13107, 8066}, {8066, 5243, 8066, 5243},
{13107, 8066, 13107, 8066}, {8066, 5243, 8066, 5243}},
{{11916, 7490, 11916, 7490}, {7490, 4660, 7490, 4660},
{11916, 7490, 11916, 7490}, {7490, 4660, 7490, 4660}},
{{10082, 6554, 10082, 6554}, {6554, 4194, 6554, 4194};
{10082, 6554, 10082, 6554}, {6554, 4194, 6554, 4194}},
{{9362, 5825, 9362, 5825}, {5825, 3647, 5825, 3647},
{9362, 5825, 9362, 5825}, {5825, 3647, 5825, 3647}},
{{8192, 5243, 8192, 5243}, {5243, 3355, 5243, 3355},
{8192, 5243, 8192, 5243}, {5243, 3355, 5243, 3355}},
{{7282, 4559, 7282, 4559}, {4559, 2893, 4559, 2893},
{7282, 4559, 7282, 4559}, {4559, 2893, 4559, 2893}},};

QMat$^{(1)}$[6][4][4] = {{{6554, 4033, 6554, 4033}{4033, 2622, 4033, 2622},
{6554, 4033, 6554, 4033}, {4033, 2622, 4033, 2622}},
{{5958, 3745, 5958, 3745}, {3745, 2330, 3745, 2330},
{5958, 3745, 5958, 3745}, {3745, 2330, 3745, 2330}},
{{5041, 3277, 5041, 3277}, {3277, 2097, 3277, 2097},
{5041, 3277, 5041, 3277}, {3277, 2097, 3277, 2097}},
{{4681, 2913, 4681, 2913}, {2913, 1824, 2913, 1824},
{4681, 2913, 4681, 2913}, {2913, 1824, 2913, 1824}},
{{4096, 2622, 4096, 2622}, {2622, 1678, 2622, 1678},
{4096, 2622, 4096, 2622}, {2622, 1678, 2622, 1678}},
{{3641, 2280, 3641, 2280}, {2280, 1447, 2280, 1447},
{3641, 2280, 3641, 2280}, {2280, 1447, 2280, 1447}},};

QMat$^{(2)}$[6][4][4] = {{{3277, 2017, 3277, 2017}, {2017, 1311, 2017, 1311},
{3277, 2017, 3277, 2017}, {2017, 1311, 2017, 1311}},
{{2979, 1873, 2979, 1873}, {1873, 1165, 1873, 1165},
{2979, 1873, 2979, 1873}, {1873, 1165, 1873, 1165}},
{{2521, 1639, 2521, 1639}, {1639, 1049, 1639, 1049},
{2521, 1639, 2521, 1639}, {1639, 1049, 1639, 1049}},
{{2341, 1456, 2341, 1456}, {1456, 912, 1456, 912},
{2341, 1456, 2341, 1456}, {1456, 912, 1456, 912}},
{{2048, 1311, 2048, 1311}, {1311, 839, 1311, 839},
{2048, 1311, 2048, 1311}, {1311, 839, 1311, 839}},
{{1821, 1140, 1821, 1140}, {1140, 723, 1140, 723},
{1821, 1140, 1821, 1140}, {1140, 723, 1140, 723}},};

QMat$^{(3)}$[6][4][4] = {{{1638, 1008, 1638, 1008}, {1008, 655, 1008, 655},
{1638, 1008, 1638, 1008}, {1088, 655, 1008, 655}},
{{1490, 936, 1490, 936}, {936, 583, 936, 583}, {1490, 936, 1490, 936},
{936, 583, 936, 583}}, {{1260, 819, 1260, 819},
{819, 524, 719, 524}, {1260, 819, 1260, 819}, {819, 524, 819, 524}},
{{1170, 728, 1170, 728}, {728, 456, 728, 456},
{1170, 728, 1170, 728}, {728, 456, 728, 456}},
{{1024, 655, 1024, 655}, {655, 419, 655, 419}, {1024, 655, 1024, 655},
{615, 419, 655, 419}}, {{910, 570, 910, 570}, {570, 362, 570, 362},
{910, 570, 910, 570}, {570, 362, 570, 362}},};

QMat$^{(4)}$[6][4][4] = {{{819, 504, 819, 504}, {504, 328, 504, 328},
{819, 504, 819, 504}, {504, 328, 504, 328}}, {{745, 468, 745, 468},
{468, 291, 468, 291}, {745, 468, 745, 468}, {468, 291, 468, 291}},
{{630, 410, 630, 410}, {410, 262, 410, 262}, {630, 410, 630, 410},
{410, 262, 410, 262}}, {{585, 364, 585, 364},
{364, 228, 364, 228}, {585, 364, 585, 364}, {364, 228, 364, 228}},
{{512, 328, 512, 328}, {328, 210, 328, 210}, {512, 328, 512, 328},
{328, 210, 328, 210}}, {{455, 285, 455, 285}, {285, 181, 285, 181},
{455, 285, 455, 285}, {285, 181, 285, 181}},};

-continued $QMat^{(5)}[6][4][4] = \{\{\{410, 252, 410, 252\}, \{252, 164, 252, 164\},$ $\{410, 252, 410, 252\}, \{252, 164, 252, 164\}\}, \{\{372, 234, 372, 234\},$ $\{234, 146, 234, 146\}, \{372, 234, 372, 234\}, \{234, 146, 234, 146\}\},$ $\{\{315, 205, 315, 205\}, \{205, 131, 205, 131\}\{315, 205, 315, 205\},$ $\{205, 131, 205, 131\}\}, \{\{293, 182, 293, 182\},$ $\{182, 114, 182, 114\}, \{293, 182, 293, 182\}, \{182, 114, 182, 114\}\},$ $\{\{256, 164, 256, 164\}, \{164, 105, 164, 105\}, \{256, 164, 256, 164\},$ $\{164, 105, 164, 105\}\}, \{\{228, 142, 228, 142\}, \{142, 90, 142, 90\},$ $\{228, 142, 228, 142\}, \{142, 90, 142, 90\}\},\};$ $QMat^{(6)}[6][4][4] = \{\{\{205, 126, 205, 126\}, \{126, 82, 126, 82\},$ $\{205, 126, 205, 126\}, \{126, 82, 126, 82\}\},$ -continued $\{\{186, 117, 186, 117\}, \{117, 73, 117, 73\}, \{186, 117, 186, 117\},$ $\{117, 73, 117, 73\}\}, \{\{158, 102, 158, 102\},$ $\{102, 66, 102, 66\}, \{158, 102, 158, 102\}, \{102, 66, 102, 66\}\},$ $\{\{146, 91, 146, 91\}, \{91, 57, 91, 57\}, \{146, 91, 146, 91\},$ $\{91, 57, 91, 57\}\}, \{\{128, 82, 128, 82\}, \{82, 52, 82, 52\},$ $\{128, 82, 128, 82\}, \{82, 52, 82, 52\}\}, \{\{114, 71, 114, 71\},$ $\{71, 45, 71, 45\}, \{114, 71, 114, 71\}, \{71, 45, 71, 45\}\},\};$ $QMat^{(7)}[6][4][4] = \{\{\{102, 63, 102, 63\}, \{63, 41, 63, 41\},$ $\{102, 63, 102, 63\}, \{63, 41, 63, 41\}\},$ $\{\{93, 59, 93, 59\}, \{59, 36, 59, 36\}, \{93, 59, 93, 59\}, \{59, 36, 59, 36\}\},$ $\{\{79, 51, 79, 51\}, \{51, 33, 51, 33\}, \{79, 51, 79, 51\}, \{51, 33, 51, 33\}\},$ $\{\{73, 46, 73, 46\}, \{46, 28, 46, 28\}, \{73, 46, 73, 46\}, \{46, 28, 46, 28\}\},$ $\{\{64, 41, 64, 41\}, \{41, 26, 41, 26\}, \{64, 41, 64, 41\}, \{41, 26, 41, 26\}\},$ $\{\{57, 36, 57, 36\}, \{36, 23, 36, 23\},$ $\{57, 36, 57, 36\}, \{36, 23, 36, 23\}\},\};$ $QMat^{(8)}[6][4][4] = \{\{\{51, 32, 51, 32\}, \{32, 20, 32, 20\},$ $\{51, 32, 51, 32\}, \{32, 20, 32, 20\}\},$ $\{\{47, 29, 47, 29\}, \{29, 18, 29, 18\}, \{47, 29, 47, 29\}, \{29, 18, 29, 18\}\},$ $\{\{39, 26, 39, 26\}, \{26, 16, 26, 16\}, \{39, 26, 39, 26\}, \{26, 16, 26, 16\}\},$ $\{\{37, 23, 37, 23\}, \{23, 14, 23, 14\}, \{37, 23, 37, 23\}, \{23, 14, 23, 14\}\},$ $\{\{32, 20, 32, 20\}, \{20, 13, 20, 13\}, \{32, 20, 32, 20\}, \{20, 13, 20, 13\}\},$ $\{\{28, 18, 28, 18\}, \{18, 11, 18, 11\}, \{28, 18, 28, 18\}, \{18, 11, 18, 11\}\},\};$ Note that in $QMat^{(8)}[6][4][4]$ only $QMat^{(8)}(0,0,0)$, $QMat^{(8)}(1,0,0)$, $QMat^{(8)}(2,0,0)$, $QMat^{(8)}(3,0,0)$, $QMat^{(8)}(4,0,0)$, $QMat^{(8)}(5,0,0)$ are used, the rest of components in $QMat^{(8)}[6][4][4]$ do not need to be stored. Therefore, the total table size is about 1350 bytes ($QMat^{(0)}$ to $QMat^{(5)}$ stored as two-byte entries, $QMat^{(6)}$ to $QMat^{(8)}$ stored as one-byte entries).

For implementations in which a small table size is desired, the quantization matrices for a macroblock can be computed on the fly according to the quantization scales $QP_Y$ and $QP_C$ by $$QMat^{(0)}(QP_Y\%6, i, j) = QLevelScale(QP_Y\%6, i, j) \quad \text{for } QP_Y/6 < 2$$
$$QMat^{(QPy/6-1)}(QP_Y\%6, i, j) = (QLevelScale(QP_Y\%6, i, j) + 2^{QPy/6-2}) >> (QP_Y/6-1) \quad \text{otherwise}$$

$$QMat^{(0)}(QP_C\%6, i, j) = QLevelScale(QP_C\%6, i, j) \quad \text{for } QP_C/6 < 2$$
$$QMat^{(QPc/6-1)}(QP_C\%6, i, j) = (QLevelScale(QP_C\%6, i, j) + 2^{QPc/6-2}) >> (QP_C/6-1) \quad \text{otherwise}$$

and $$QMat^{(QPy/6)}(QP_Y\%6, 0, 0) = (QLevelScale(QP_Y\%6, 0, 0) + 2^{QPy/6-1}) >> QP_Y/6$$
$$QMat^{(QPy/6)}(QP_C\%6, 0, 0) = (QLevelScale(QP_C\%6, 0, 0) + 2^{QPy/6-1}) >> QP_C/6$$

Therefore, for a macroblock, a 4×4 quantization matrix for 16 luminance blocks, a 4×4 quantization matrix for 8 chrominance blocks, a quantization scale for a 4×4 luminance DC block, and a quantization scale for two 2×2 chrominance DC blocks need to be computed for the transform coefficients quantization according to a given $QP_Y$ and $QP_C$. Since the quantization scales do not change very frequently from macroblock to macroblock, such a quantization matrix computations normally do not need to be performed for each macroblock.

4. Experimental Results

Figure 4:
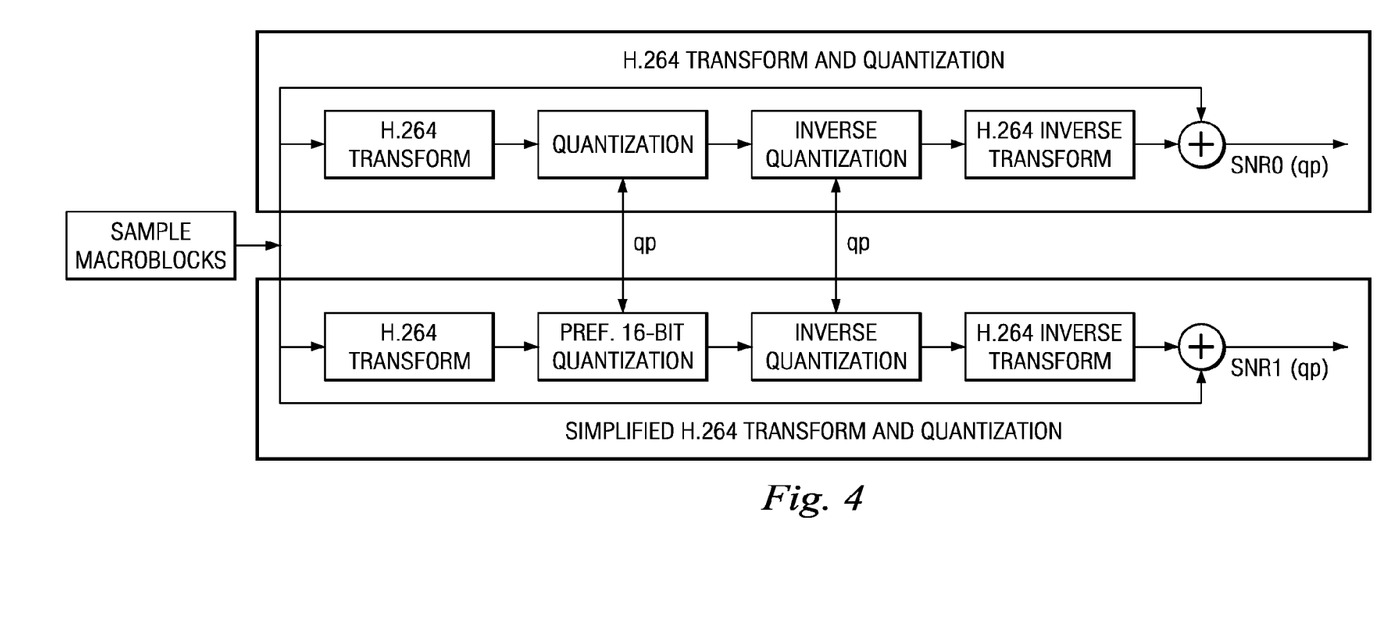
FIG. 4 illustrates method comparisons.

Simulations were carried out to test the efficiency of the preferred embodiment simplified forward quantization for H264. "Anchor T&Q" is the H264 transform plus quantization which is made up of equation from (a) to (l), the "Simplified T&Q" is made up of equations from (a), (b'), (c), (d), (e), (f'), (g), (h), (i), (j'), (k), and (l); that is, only the forward quantization is changed in this case, everything else remains the same. All quantization steps (qp=0, 1, 2, . . . 51) are tested through. Each qp is tested with 5000 random macroblocks, the sample value is in the range of [−255:255]. The PSNR values between the input sample macroblocks and their reconstructed macroblocks are computed (see FIG. 4) over all the test sample macroblocks for each qp. The results are listed in the following Tables 1, 2, 3.

TABLE 1

Simulation results INTER-coded macroblocks, $\alpha = \frac{1}{6}$ is used

| qp | Anchor T&Q SNR0 Y, U, V [dB] | Simplified T&Q SNR1 Y, U, V [dB], ($\Delta$ dB) |
|---|---|---|
| 0 | 59.105, 59.168, 59.180 | 59.105, 59.168, 59.180 (0.000, 0.000, 0.000) |
| 1 | 57.688, 57.765, 57.697 | 57.688, 57.765, 57.697 (0.000, 0.000, 0.000) |
| 2 | 55.667, 55.679, 55.683 | 55.667, 55.679, 55.683 (0.000, 0.000, 0.000) |
| 3 | 55.094, 55.119, 55.125 | 55.094, 55.119, 55.125 (0.000, 0.000, 0.000) |
| 4 | 53.950, 53.986, 53.999 | 53.950, 53.986, 53.999 (0.000, 0.000, 0.000) |
| 5 | 52.975, 52.997, 52.981 | 52.975, 52.997, 52.981 (0.000, 0.000, 0.000) |
| 6 | 51.955, 52.020, 51.998 | 51.955, 52.020, 51.998 (0.000, 0.000, 0.000) |
| 7 | 51.344, 51.363, 51.412 | 51.344, 51.363, 51.412 (0.000, 0.000, 0.000) |
| 8 | 50.505, 50.545, 50.539 | 50.505, 50.545, 50.539 (0.000, 0.000, 0.000) |
| 9 | 49.860, 49.921, 49.904 | 49.860, 49.921, 49.904 (0.000, 0.000, 0.000) |
| 10 | 48.933, 49.035, 48.984 | 48.933, 49.035, 48.984 (0.000, 0.000, 0.000) |
| 11 | 47.861, 47.912, 47.900 | 47.861, 47.912, 47.900 (0.000, 0.000, 0.000) |
| 12 | 46.876, 46.978, 46.887 | 46.876, 46.978, 46.887 (0.000, 0.000, 0.000) |
| 13 | 45.942, 46.011, 46.128 | 45.942, 46.011, 46.128 (0.000, 0.000, 0.000) |
| 14 | 45.202, 45.192, 45.258 | 45.202, 45.192, 45.258 (0.000, 0.000, 0.000) |
| 15 | 44.111, 44.224, 44.244 | 44.127, 44.224, 44.245 (0.016, 0.000, 0.000) |
| 16 | 43.187, 43.371, 43.340 | 43.203, 43.378, 43.346 (0.016, 0.007, 0.007) |
| 17 | 42.303, 42.242, 42.273 | 42.322, 42.242, 42.274 (0.019, 0.000, 0.000) |
| 18 | 41.107, 41.163, 41.189 | 41.162, 41.164, 41.190 (0.054, 0.001, 0.001) |
| 19 | 40.248, 40.372, 40.340 | 40.295, 40.372, 40.340 (0.046, 0.000, 0.000) |
| 20 | 39.175, 39.257, 39.275 | 39.210, 39.262, 39.281 (0.035, 0.005, 0.005) |
| 21 | 38.179, 38.323, 38.365 | 38.186, 38.323, 38.365 (0.007, 0.000, 0.000) |
| 22 | 37.418, 37.420, 37.515 | 37.428, 37.420, 37.515 (0.010, 0.000, 0.000) |
| 23 | 36.424, 36.381, 36.335 | 36.414, 36.368, 36.323 (−0.010, −0.013, −0.012) |
| 24 | 35.103, 35.323, 35.289 | 35.100, 35.323, 35.289 (−0.003, 0.000, 0.000) |
| 25 | 34.361, 34.594, 34.562 | 34.376, 34.596, 34.563 (0.015, 0.001, 0.001) |
| 26 | 33.240, 33.474, 33.466 | 33.239, 33.474, 33.466 (−0.001, 0.000, 0.000) |
| 27 | 32.243, 32.521, 32.505 | 32.249, 32.521, 32.505 (0.006, 0.000, 0.000) |
| 28 | 31.335, 31.617, 31.650 | 31.324, 31.616, 31.649 (−0.011, −0.001, −0.001) |
| 29 | 30.276, 30.548, 30.556 | 30.254, 30.539, 30.531 (−0.022, −0.008, −0.025) |
| 30 | 29.276, 30.557, 30.580 | 29.283, 30.547, 30.552 (0.007, −0.009, −0.028) |
| 31 | 28.491, 29.604, 29.628 | 28.481, 29.604, 29.628 (−0.010, 0.000, 0.000) |
| 32 | 27.300, 28.922, 28.890 | 27.321, 28.922, 28.889 (0.021, −0.000, −0.000) |
| 33 | 26.371, 27.819, 27.840 | 26.376, 27.819, 27.840 (0.005, 0.000, 0.000) |
| 34 | 25.459, 27.798, 27.856 | 25.470, 27.798, 27.856 (0.012, 0.000, 0.000) |
| 35 | 24.216, 26.944, 26.933 | 24.208, 26.945, 26.933 (−0.008, 0.000, 0.000) |
| 36 | 23.307, 26.169, 26.158 | 23.316, 26.169, 26.158 (0.009, 0.000, 0.000) |
| 37 | 22.623, 26.176, 26.144 | 22.638, 26.176, 26.144 (0.015, 0.000, 0.000) |
| 38 | 21.477, 25.190, 25.223 | 21.476, 25.187, 25.220 (−0.001, −0.003, −0.003) |
| 39 | 20.498, 25.180, 25.218 | 20.501, 25.177, 25.215 (0.003, −0.003, −0.003) |
| 40 | 19.688, 24.510, 24.473 | 19.695, 24.510, 24.473 (0.007, 0.000, 0.000) |
| 41 | 18.517, 24.505, 24.488 | 18.488, 24.505, 24.488 (−0.029, 0.000, 0.000) |
| 42 | 17.527, 24.006, 24.017 | 17.528, 24.008, 24.021 (0.001, 0.002, 0.004) |
| 43 | 16.823, 24.022, 24.009 | 16.832, 24.025, 24.013 (0.008, 0.004, 0.004) |
| 44 | 15.786, 24.006, 24.023 | 15.789, 24.009, 24.026 (0.003, 0.004, 0.003) |
| 45 | 14.903, 23.439, 23.448 | 14.898, 23.440, 23.449 (−0.004, 0.001, 0.000) |
| 46 | 14.141, 23.447, 23.445 | 14.123, 23.447, 23.446 (−0.018, 0.000, 0.001) |
| 47 | 13.161, 23.449, 23.450 | 13.144, 23.450, 23.451 (−0.018, 0.001, 0.001) |
| 48 | 12.462, 23.124, 23.119 | 12.459, 23.124, 23.119 (−0.004, −0.000, −0.000) |
| 49 | 11.969, 23.126, 23.116 | 11.966, 23.126, 23.116 (−0.003, −0.001, −0.000) |
| 50 | 11.404, 23.125, 23.120 | 11.411, 23.124, 23.120 (0.006, −0.000, −0.000) |
| 51 | 11.086, 23.129, 23.126 | 11.088, 23.129, 23.126 (0.002, −0.000, −0.000) |

TABLE 2

Simulation results INTRA 4 × 4-coded macroblocks, $\alpha = \frac{1}{3}$ is used

| qp | Anchor T&Q SNR0 Y, U, V [dB] | Simplified T&Q SNR1 Y, U, V [dB], ($\Delta$ dB) |
|---|---|---|
| 0 | 65.655, 65.735, 65.687 | 65.655, 65.735, 65.687 (0.000, 0.000, 0.000) |
| 1 | 63.130, 63.198, 63.415 | 63.130, 63.198, 63.415 (0.000, 0.000, 0.000) |
| 2 | 60.202, 60.213, 60.218 | 60.202, 60.213, 60.218 (0.000, 0.000, 0.000) |
| 3 | 58.500, 58.699, 58.704 | 58.500, 58.699, 58.704 (0.000, 0.000, 0.000) |
| 4 | 57.331, 57.158, 57.197 | 57.331, 57.158, 57.197 (0.000, 0.000, 0.000) |
| 5 | 55.651, 55.646, 55.650 | 55.651, 55.646, 55.650 (0.000, 0.000, 0.000) |
| 6 | 54.264, 54.293, 54.305 | 54.264, 54.293, 54.305 (0.000, 0.000, 0.000) |
| 7 | 53.502, 53.502, 53.543 | 53.502, 53.502, 53.543 (0.000, 0.000, 0.000) |
| 8 | 52.686, 52.692, 52.711 | 52.686, 52.692, 52.711 (0.000, 0.000, 0.000) |
| 9 | 51.794, 51.813, 51.792 | 51.794, 51.813, 51.792 (0.000, 0.000, 0.000) |
| 10 | 50.804, 51.011, 50.933 | 50.804, 51.011, 50.933 (0.000, 0.000, 0.000) |
| 11 | 50.138, 50.132, 50.132 | 50.138, 50.132, 50.132 (0.000, 0.000, 0.000) |
| 12 | 49.182, 49.181, 49.162 | 49.182, 49.181, 49.162 (0.000, 0.000, 0.000) |
| 13 | 48.321, 48.407, 48.327 | 48.321, 48.407, 48.327 (0.000, 0.000, 0.000) |
| 14 | 47.325, 47.331, 47.320 | 47.325, 47.331, 47.320 (0.000, 0.000, 0.000) |
| 15 | 46.247, 46.358, 46.371 | 46.393, 46.496, 46.512 (0.146, 0.138, 0.141) |

TABLE 2-continued

Simulation results INTRA 4 × 4-coded macroblocks, $\alpha = 1/3$ is used

| qp | Anchor T&Q SNR0 Y, U, V [dB] | Simplified T&Q SNR1 Y, U, V [dB], (Δ dB) |
|---|---|---|
| 16 | 45.603, 45.594, 45.608 | 45.617, 45.594, 45.608 (0.014, 0.000, 0.000) |
| 17 | 44.544, 44.469, 44.494 | 44.564, 44.473, 44.497 (0.020, 0.004, 0.003) |
| 18 | 43.394, 43.418, 43.465 | 43.409, 43.418, 43.465 (0.015, 0.000, 0.000) |
| 19 | 42.715, 42.716, 42.677 | 42.717, 42.716, 42.677 (0.002, 0.000, 0.000) |
| 20 | 41.581, 41.579, 41.589 | 41.596, 41.579, 41.590 (0.016, 0.000, 0.001) |
| 21 | 40.548, 40.596, 40.569 | 40.554, 40.596, 40.569 (0.006, 0.000, 0.000) |
| 22 | 39.686, 39.598, 39.735 | 39.693, 39.598, 39.735 (0.008, 0.000, 0.000) |
| 23 | 38.765, 38.547, 38.585 | 38.756, 38.534, 38.574 (−0.009, −0.013, −0.011) |
| 24 | 37.544, 37.576, 37.570 | 37.530, 37.575, 37.570 (−0.014, −0.000, 0.000) |
| 25 | 36.778, 36.818, 36.770 | 36.802, 36.836, 36.787 (0.024, 0.018, 0.017) |
| 26 | 35.637, 35.607, 35.639 | 35.634, 35.607, 35.639 (−0.002, 0.000, 0.000) |
| 27 | 34.527, 34.667, 34.617 | 34.532, 34.667, 34.618 (0.004, 0.000, 0.000) |
| 28 | 33.702, 33.787, 33.768 | 33.678, 33.785, 33.767 (−0.025, −0.001, −0.001) |
| 29 | 32.453, 32.616, 32.626 | 32.436, 32.591, 32.597 (−0.017, −0.025, −0.029) |
| 30 | 31.571, 32.609, 32.638 | 31.581, 32.586, 32.610 (0.010, −0.023, −0.028) |
| 31 | 30.831, 31.631, 31.638 | 30.829, 31.631, 31.638 (−0.002, 0.000, 0.000) |
| 32 | 29.640, 30.845, 30.868 | 29.640, 30.845, 30.868 (−0.001, 0.000, 0.000) |
| 33 | 28.587, 29.740, 29.699 | 28.589, 29.740, 29.699 (0.002, 0.000, 0.000) |
| 34 | 27.747, 29.733, 29.703 | 27.763, 29.733, 29.703 (0.016, 0.000, −0.000) |
| 35 | 26.558, 28.759, 28.740 | 26.549, 28.759, 28.740 (−0.010, 0.000, 0.000) |
| 36 | 25.529, 27.850, 27.867 | 25.531, 27.850, 27.867 (0.002, 0.000, 0.000) |
| 37 | 24.762, 27.857, 27.857 | 24.775, 27.857, 27.857 (0.013, 0.000, 0.000) |
| 38 | 23.652, 26.742, 26.743 | 23.660, 26.729, 26.734 (0.008, −0.013, −0.009) |
| 39 | 22.650, 26.737, 26.736 | 22.653, 26.723, 26.726 (0.003, −0.013, −0.010) |
| 40 | 21.785, 25.859, 25.851 | 21.788, 25.859, 25.851 (0.003, 0.000, 0.000) |
| 41 | 20.583, 25.859, 25.853 | 20.552, 25.859, 25.853 (−0.031, 0.000, 0.000) |
| 42 | 19.626, 25.203, 25.207 | 19.631, 25.207, 25.212 (0.005, 0.004, 0.005) |
| 43 | 18.838, 25.216, 25.211 | 18.841, 25.220, 25.215 (0.003, 0.004, 0.004) |
| 44 | 17.655, 25.196, 25.221 | 17.659, 25.200, 25.226 (0.004, 0.004, 0.005) |
| 45 | 16.697, 24.358, 24.371 | 16.694, 24.359, 24.372 (−0.004, 0.001, 0.001) |
| 46 | 15.818, 24.362, 24.349 | 15.809, 24.363, 24.350 (−0.009, 0.001, 0.001) |
| 47 | 14.711, 24.368, 24.343 | 14.692, 24.369, 24.344 (−0.019, 0.001, 0.001) |
| 48 | 13.844, 23.798, 23.796 | 13.842, 23.798, 23.795 (−0.003, −0.000, −0.001) |
| 49 | 13.186, 23.801, 23.785 | 13.195, 23.801, 23.785 (0.009, −0.001, −0.001) |
| 50 | 12.313, 23.789, 23.790 | 12.315, 23.788, 23.789 (0.002, −0.001, −0.001) |
| 51 | 11.751, 23.807, 23.792 | 11.755, 23.806, 23.791 (0.003, −0.001, −0.000) |

TABLE 3

Simulation results INTRA 16 × 16-coded macroblocks, $\alpha = 1/3$ is used

| qp | Anchor T&Q SNR0 Y, U, V [dB] | Simplified T&Q SNR1 Y, U, V [dB], (Δ dB) |
|---|---|---|
| 0 | 65.578, 65.735, 65.687 | 65.578, 65.735, 65.687 (0.000, 0.000, 0.000) |
| 1 | 63.099, 63.198, 63.415 | 63.099, 63.198, 63.415 (0.000, 0.000, 0.000) |
| 2 | 60.191, 60.213, 60.218 | 60.191, 60.213, 60.218 (0.000, 0.000, 0.000) |
| 3 | 58.494, 58.699, 58.704 | 58.494, 58.699, 58.704 (0.000, 0.000, 0.000) |
| 4 | 57.281, 57.158, 57.197 | 57.281, 57.158, 57.197 (0.000, 0.000, 0.000) |
| 5 | 55.644, 55.646, 55.650 | 55.644, 55.646, 55.650 (0.000, 0.000, 0.000) |
| 6 | 54.299, 54.293, 54.305 | 54.299, 54.293, 54.305 (0.000, 0.000, 0.000) |
| 7 | 53.497, 53.502, 53.543 | 53.497, 53.502, 53.543 (0.000, 0.000, 0.000) |
| 8 | 52.686, 52.692, 52.711 | 52.686, 52.692, 52.711 (0.000, 0.000, 0.000) |
| 9 | 51.770, 51.813, 51.792 | 51.770, 51.813, 51.792 (0.000, 0.000, 0.000) |
| 10 | 50.867, 51.011, 50.933 | 50.867, 51.011, 50.933 (0.000, 0.000, 0.000) |
| 11 | 50.123, 50.132, 50.132 | 50.123, 50.132, 50.132 (0.000, 0.000, 0.000) |
| 12 | 49.153, 49.181, 49.162 | 49.153, 49.181, 49.162 (0.000, 0.000, 0.000) |
| 13 | 48.334, 48.407, 48.327 | 48.334, 48.407, 48.327 (0.000, 0.000, 0.000) |
| 14 | 47.312, 47.331, 47.320 | 47.312, 47.331, 47.320 (−0.000, 0.000, 0.000) |
| 15 | 46.255, 46.358, 46.371 | 46.403, 46.496, 46.512 (0.148, 0.138, 0.141) |
| 16 | 45.545, 45.594, 45.608 | 45.559, 45.594, 45.608 (0.014, 0.000, 0.000) |
| 17 | 44.530, 44.469, 44.494 | 44.550, 44.473, 44.497 (0.020, 0.004, 0.003) |
| 18 | 43.401, 43.418, 43.465 | 43.416, 43.418, 43.465 (0.015, 0.000, 0.000) |
| 19 | 42.705, 42.716, 42.677 | 42.709, 42.716, 42.677 (0.003, 0.000, 0.000) |
| 20 | 41.599, 41.579, 41.589 | 41.615, 41.579, 41.590 (0.015, 0.000, 0.001) |
| 21 | 40.544, 40.596, 40.569 | 40.550, 40.596, 40.569 (0.006, 0.000, 0.000) |
| 22 | 39.732, 39.598, 39.735 | 39.740, 39.598, 39.735 (0.008, 0.000, 0.000) |
| 23 | 38.757, 38.547, 38.585 | 38.737, 38.534, 38.574 (−0.021, −0.013, −0.011) |
| 24 | 37.528, 37.576, 37.570 | 37.515, 37.575, 37.570 (−0.014, −0.000, 0.000) |
| 25 | 36.785, 36.818, 36.770 | 36.810, 36.836, 36.787 (0.024, 0.018, 0.017) |
| 26 | 35.642, 35.607, 35.639 | 35.640, 35.607, 35.639 (−0.002, 0.000, 0.000) |
| 27 | 34.536, 34.667, 34.617 | 34.540, 34.667, 34.618 (0.004, 0.000, 0.000) |
| 28 | 33.725, 33.787, 33.768 | 33.700, 33.785, 33.767 (−0.025, −0.001, −0.001) |
| 29 | 32.448, 32.616, 32.626 | 32.432, 32.591, 32.597 (−0.016, −0.025, −0.029) |
| 30 | 31.577, 32.609, 32.638 | 31.589, 32.586, 32.610 (0.011, −0.023, −0.028) |
| 31 | 30.827, 31.631, 31.638 | 30.825, 31.631, 31.638 (−0.003, 0.000, 0.000) |
| 32 | 29.643, 30.845, 30.868 | 29.642, 30.845, 30.868 (−0.001, 0.000, 0.000) |
| 33 | 28.581, 29.740, 29.699 | 28.585, 29.740, 29.699 (0.004, 0.000, 0.000) |
| 34 | 27.747, 29.733, 29.703 | 27.763, 29.733, 29.703 (0.016, 0.000, −0.000) |
| 35 | 26.561, 28.759, 28.740 | 26.558, 28.759, 28.740 (−0.002, 0.000, 0.000) |

TABLE 3-continued

Simulation results INTRA 16 × 16-coded macroblocks, $\alpha = \frac{1}{3}$ is used

| qp | Anchor T&Q SNR0 Y, U, V [dB] | Simplified T&Q SNR1 Y, U, V [dB], ($\Delta$ dB) |
|---|---|---|
| 36 | 25.525, 27.850, 27.867 | 25.528, 27.850, 27.867 (0.004, 0.000, 0.000) |
| 37 | 24.773, 27.857, 27.857 | 24.784, 27.857, 27.857 (0.012, 0.000, 0.000) |
| 38 | 23.640, 26.742, 26.743 | 23.651, 26.729, 26.734 (0.011, −0.013, −0.009) |
| 39 | 22.654, 26.737, 26.736 | 22.653, 26.723, 26.726 (−0.001, −0.013, −0.010) |
| 40 | 21.787, 25.859, 25.851 | 21.790, 25.859, 25.851 (0.003, 0.000, 0.000) |
| 41 | 20.582, 25.859, 25.853 | 20.551, 25.859, 25.853 (−0.031, 0.000, 0.000) |
| 42 | 19.626, 25.203, 25.207 | 19.627, 25.207, 25.212 (0.001, 0.004, 0.005) |
| 43 | 18.837, 25.216, 25.211 | 18.840, 25.220, 25.215 (0.003, 0.004, 0.004) |
| 44 | 17.653, 25.196, 25.221 | 17.656, 25.200, 25.226 (0.003, 0.004, 0.005) |
| 45 | 16.699, 24.358, 24.371 | 16.696, 24.359, 24.372 (−0.003, 0.001, 0.001) |
| 46 | 15.818, 24.362, 24.349 | 15.810, 24.363, 24.350 (−0.009, 0.001, 0.001) |
| 47 | 14.711, 24.368, 24.343 | 14.694, 24.369, 24.344 (−0.017, 0.001, 0.001) |
| 48 | 13.846, 23.798, 23.796 | 13.845, 23.798, 23.795 (−0.002, −0.000, −0.001) |
| 49 | 13.188, 23.801, 23.785 | 13.199, 23.801, 23.785 (0.011, −0.001, −0.001) |
| 50 | 12.315, 23.789, 23.790 | 12.315, 23.788, 23.789 (−0.001, −0.001, −0.001) |
| 51 | 11.753, 23.807, 23.792 | 11.758, 23.806, 23.791 (0.005, −0.001, −0.000) |

As shown in Tables 1~3, the preferred embodiment simplified forward quantization performs almost identically to the quantization currently recommended by H.264, for all the allowed quantization scales (0-51) and the macroblock types (INTER, INTRA4×4 or INTRA16×16). Thus the preferred embodiment quantization provides the same compression efficient as the current H.264 quantization design, but enables the H.264 quantization to be implemented on devices with no capability of 32-bit memory access.

5. Modifications

Various modifications to the preferred embodiments may be made while retaining the feature of multiple quantization tables to limit bit size of a rounding control parameter. For example, the quantization may use finer resolution, such as increments of qP/8 rather than qP/6, and so forth.

What is claimed is:

1. A method of video encoding, comprising the steps of:
    (a) transforming, using a processor, a 4×4 block of integer data into a 4×4 block of integer transform coefficients; and
    (b) quantizing, using a processor, said 4×4 block of integer transform coefficients by (i) element-by-element multiplication of absolute values of said coefficients with entries of one of a plurality of 4×4 positive integer quantization matrices, (ii) addition of a rounding control parameter, (iii) restoration of the signs of said coefficients, (iv) and right shifting;
    (c) wherein a first matrix of said plurality of 4×4 positive integer quantization matrices has entries which are equal to one-half with round-off of corresponding entries of a second matrix of said plurality of 4×4 positive integer quantization matrices; and
    (d) said one of said plurality of 4×4 positive integer quantization matrices is selected according to a quantization parameter.

2. The method of claim 1, wherein:
    (a) said plurality of 4×4 positive integer quantization matrices includes 4×4 matrices $M_0, M_1, \ldots, M_{Q-1}$ where Q is a positive integer which factors as Q=NM with N and M positive integers each greater than 1; and
    (b) for each pair of integers n,k with n in the range 1 to N−1 and k in the range 0 to M−1, the elements of said matrices are related by $$M_{nM+k}(i,j) = (M_k(i,j) + 2^{n-1}) >> n \text{ for } 0 \leq i,j \leq 3.$$

3. The method of claim 2, wherein M=6 and N=7.

4. The method of claim 2, wherein:
    (a) with said quantization parameter equal to nM+k with n greater than 0 and with said coefficients denoted y(i,j), said quantizing includes the computations:

$$c(i,j) = \text{sign}[y(i,j)] [|y(i,j)| M_{(n-1)M+k}(i,j) + \alpha 2^{16}] >> 16$$

where $\alpha$ is a round off factor with $0 < \alpha < 1$.

5. The method of claim 2, wherein:
    (a) with said quantization parameter equal to k and with said coefficients denoted y(i,j), said quantizing includes the computations:

$$c(i,j) = \text{sign}[y(i,j)] [|y(i,j)| M_k(i,j) + \alpha 2^{15}] >> 15$$

where $\alpha$ is a round off factor with $0 < \alpha < 1$.

* * * * *